(12) United States Patent
Judd et al.

(10) Patent No.: US 10,417,915 B2
(45) Date of Patent: Sep. 17, 2019

(54) DYNAMIC FLIGHT TRACKING SYSTEM USING AIRBORNE COMMUNICATIONS AND GROUND DATA SERVICES

(71) Applicant: Honeywell International Inc., Morris Plains, NJ (US)

(72) Inventors: Thomas D. Judd, Woodinville, WA (US); Bradley Fessler, Scottsdale, AZ (US); Kathryn Bates Hill, Milton-Freewater, OR (US); Keith Hamilton Redner, III, Kirkland, WA (US); Scott Madaras, Peoria, AZ (US); Sarah Baird Weinhardt, Phoenix, AZ (US)

(73) Assignee: Honeywell International Inc., Morris Plains, NJ (US)

(*) Notice: Subject to any disclaimer, the term of this patent is extended or adjusted under 35 U.S.C. 154(b) by 313 days.

(21) Appl. No.: 15/437,591

(22) Filed: Feb. 21, 2017

(65) Prior Publication Data

US 2018/0082593 A1 Mar. 22, 2018

Related U.S. Application Data

(60) Provisional application No. 62/396,564, filed on Sep. 19, 2016.

(51) Int. Cl.
*G08G 5/00* (2006.01)
*G07C 5/00* (2006.01)
(Continued)

(52) U.S. Cl.
CPC ........... *G08G 5/0013* (2013.01); *G07C 5/008* (2013.01); *G08G 5/006* (2013.01); *G08G 5/0026* (2013.01);
(Continued)

(58) Field of Classification Search
CPC ..... G08G 5/0013; G08G 5/0082; G08G 5/006; G08G 5/0056; G08G 5/0026;
(Continued)

(56) References Cited

U.S. PATENT DOCUMENTS 6,385,513 B1 * 5/2002 Murray ............... H04B 7/18508
340/945
9,327,841 B1 * 5/2016 Sipper .................... B64D 45/00
(Continued)

FOREIGN PATENT DOCUMENTS

EP 3089115 11/2016
EP 3135589 3/2017
(Continued)

OTHER PUBLICATIONS

European Patent Office, "Extended European Search Report from EP Application No. 17190980.7 dated Feb. 19, 2018", from Foreign Counterpart to U.S. Appl. No. 15/437,591, dated Feb. 19, 2018, pp. 1-8, Published in: EP.

(Continued)

*Primary Examiner* — Muhammad Shafi
(74) *Attorney, Agent, or Firm* — Fogg & Powers LLC

(57) ABSTRACT

A system for dynamic flight tracking of an aircraft comprises a ground center configured to communicate with a flight tracking application onboard an aircraft, wherein the flight tracking application is preloaded with default flight tracking preferences comprising a normal time rate interval for sending normal condition position reports to the ground center when a flight condition is normal; abnormal time rate intervals for sending abnormal condition position reports to the ground center when abnormal flight conditions are detected, with the abnormal time rate intervals less than the normal time rate interval; and abnormal flight condition criteria to determine which aircraft conditions to monitor for
(Continued)

detecting abnormal flight conditions. The ground center receives flight tracking communications from the aircraft for monitoring flight conditions to determine if the aircraft is encountering abnormal flight conditions, and is operative to send an uplink request to the aircraft to change the default flight tracking preferences.

17 Claims, 2 Drawing Sheets

(51) Int. Cl.
*G01S 5/00* (2006.01)
*B64D 45/00* (2006.01)

(52) U.S. Cl.
CPC ......... *G08G 5/0052* (2013.01); *G08G 5/0056* (2013.01); *G08G 5/0082* (2013.01); *B64D 2045/0045* (2013.01); *G01S 5/0027* (2013.01)

(58) Field of Classification Search
CPC ................. G08G 5/0052; G07C 5/008; B64D 2045/0045; G01S 5/0027
USPC ............................................................ 701/3
See application file for complete search history.

(56) References Cited

U.S. PATENT DOCUMENTS

| | | | |
|---|---|---|---|
| 9,412,278 B1 | 8/2016 | Gong et al. | |
| 2003/0225492 A1 | 12/2003 | Cope et al. | |
| 2007/0032921 A1* | 2/2007 | Allen | G01C 23/005 |
| | | | 701/3 |
| 2016/0233948 A1* | 8/2016 | Le Bigot | H04B 7/18506 |

FOREIGN PATENT DOCUMENTS

| | | |
|---|---|---|
| EP | 3156769 | 4/2017 |
| WO | 2011017812 | 2/2011 |

OTHER PUBLICATIONS

Sandell, "Airline Modifiable Information (AMI)—Revision" (2009), pp. 1-47.

"Flight tracking initiatives & systems", Jun. 2015, pp. 16-24, No. 100, Publisher: Aircraft Commerce.

"Australian Enhanced Flight Tracking Evaluation", Aug. 2015, pp. 1-35, Publisher: Airservices.

* cited by examiner

DYNAMIC FLIGHT TRACKING SYSTEM USING AIRBORNE COMMUNICATIONS AND GROUND DATA SERVICES

CROSS REFERENCE TO RELATED APPLICATION

This application claims the benefit of priority to U.S. Provisional Application No. 62/396,564, filed on Sep. 19, 2016, which is herein incorporated by reference.

BACKGROUND

There are two mandates from governmental agencies for flight tracking of an aircraft. These mandates include: a long term tracking solution, which looks at final fixes that cannot be disabled or tampered with; and a short term tracking solution, which provides a flight reporting/tracking system that reports position, altitude, and other data, such as at a rate of at least every 15 minutes over an ocean. In addition, governmental agencies encourage aircraft operators to provide the ability to detect abnormal conditions for an aircraft and when they occur, report position data at an increased frequency, such as up to one minute intervals.

SUMMARY

A system for dynamic flight tracking of an aircraft comprises a ground center configured to communicate with a flight tracking application onboard an aircraft, wherein the flight tracking application is preloaded with default flight tracking preferences. The flight tracking preferences comprise a normal time rate interval for sending normal condition position reports to the ground center when a flight condition is normal; one or more abnormal time rate intervals for sending abnormal condition position reports to the ground center when one or more abnormal flight conditions are detected, with the one or more abnormal time rate intervals less than the normal time rate interval; and abnormal flight condition criteria to determine which aircraft conditions to monitor for detecting abnormal flight conditions. The ground center is operative to receive flight tracking communications from the aircraft for monitoring of flight conditions to determine if the aircraft is encountering any abnormal flight conditions, and to send an uplink request to the aircraft to change one or more of the default flight tracking preferences.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
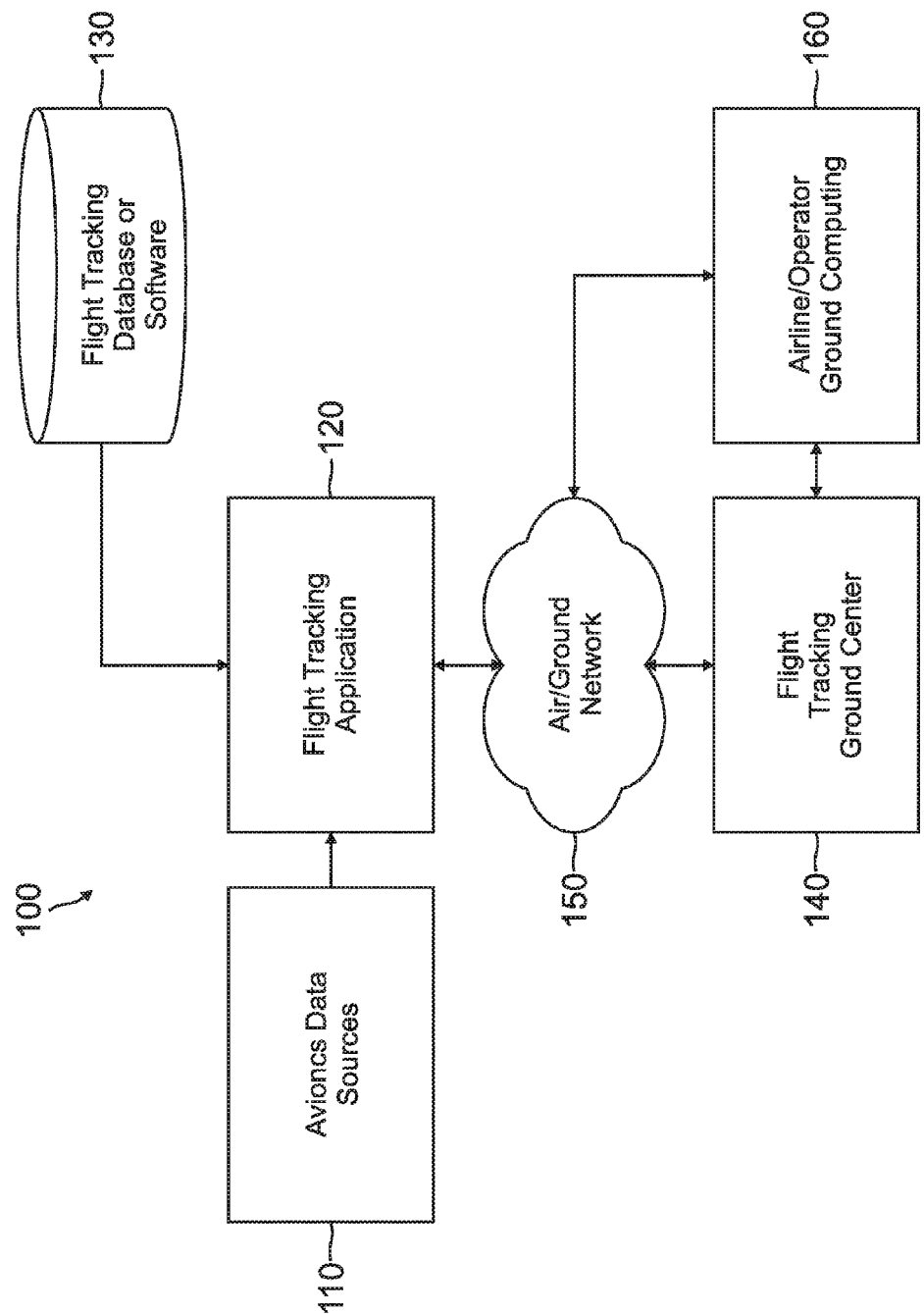
FIG. 1 a block diagram of a system for dynamic flight tracking of an aircraft, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system for dynamic flight tracking of an aircraft uses airborne communications and ground data services to implement enhanced position reporting for the aircraft. The system utilizes communications between the aircraft and a ground center to coordinate monitoring of critical aircraft parameters to determine if the aircraft is unexpectedly and significantly deviating from its flight plan or encountering abnormal operating conditions. The ground center is operative to request that report triggering criteria and/or frequency of reports from the aircraft change as the aircraft operations deviate from normal, planned operations.

The present system provides a flight tracking mechanism and services, which include the following features: an alerting mechanism; updating of abnormal condition monitoring thresholds; disabling of abnormal condition monitoring individually; and a change of reporting intervals via an uplink. Default values for abnormal condition monitoring thresholds can be defined in a database. The default values may be either configurable, such as in airline operational communication (AOC) database, or hardcoded using software, firmware, hardware, or the like.

The ground center can provide an update for a monitoring threshold and reporting frequency associated with a condition. For example, the ground center can indicate at what frequency or time interval to send a message when a specific trigger is actioned. This allows both the mechanism threshold and frequency associated with a condition to be configured from the ground center using uplinks.

The ground center can send various uplink requests, including: a request to make changes to position reporting preferences, such as modifying a normal reporting rate interval to one or more abnormal reporting rate intervals; to change condition monitoring thresholds; or to stop monitoring of one or more conditions. In exemplary implementations, one reporting rate interval can be used for all abnormal conditions, or different reporting rate intervals can be used for different abnormal conditions.

In an example, a change of a reporting rate interval (e.g., back to 15 minutes) can be implemented when conditions are determined to be normal. In addition, the reporting rate interval can have an increasing frequency rate based on monitoring from the ground (e.g., aircraft position is not following flight plan, aircraft flying over water, designated geographic areas such as hazard zones, abnormal engine report, etc.). The change of reporting rate intervals can also be based on an indication from an operator (e.g., airline operator), and the reporting rate intervals can be changed to any value (not just 1 minute or 15 minutes). The reporting rate interval can also be turned off altogether. Other features include providing a reason for an increased frequency rate of the reporting rate interval via a downlink, such as when an abnormal condition is detected. In addition, based on monitoring from the ground or detection of an event, the system can ask for additional data.

In exemplary implementations, different reporting rate intervals can be used for different abnormal condition thresholds, including: for an abnormal direction threshold, the abnormal reporting rate interval can be two minutes, for example; for a minor abnormal altitude threshold, the abnormal reporting rate interval can be three minutes, for example; and for a major abnormal altitude threshold, the abnormal reporting rate interval can be one minute, for example.

The system can be implemented by updating a database or hardcoded software in an avionics device and in a peer flight tracking ground center, which provides ground flight tracking monitoring services. It should be understood that some features of the flight tracking mechanism will be available only if a ground system, such as the flight tracking ground center, supports such features.

Further details of the flight tracking system are described hereafter with reference to the drawings.

FIG. 1 illustrates a system 100 for enhanced flight tracking and position reporting, according to one embodiment. The system 100 generally includes one or more avionics data sources 110, and an airborne flight tracking application 120 in operative communication with avionics data sources 110. The flight tracking application 120 can be an AOC application, an aircraft condition monitoring system (ACMS) application, or the like.

In addition, a flight tracking database or software implementation 130 is in operative communication with flight tracking application 120. In exemplary embodiments, the flight tracking database can be a configurable AOC database, and the flight tracking software can be AOC software that is hardcoded. When employed, the AOC database (also called airline modifiable information (AMI) database in some aircraft) can be created using a ground reconfiguration tool, such as an ACARS reconfiguration tool (ART) (for AOC database) or a ground based software tool (GBST) (for AMI). In addition, the ACMS can also use an ACMS AMI database and GBST.

A flight tracking ground center 140 is in operative communication with flight tracking application 120 through an air/ground network 150. An airline/operator ground computing center 160 is in operative communication with flight tracking ground center 140, and can also directly communicate with flight tracking application 120 through air/ground network 150. The air/ground network 150 can include very high frequency (VHF) data radio (VDR) communications, satellite communications (SATCOM), high frequency (HF) data radio communications, ARINC/SITA/ADCC and other service providers, ground stations, as well as IP/broadband (IP/BB) datalink subnetworks such as WiFi, cellular, broadband SATCOM, AeroMACS, or the like.

The avionics data sources 110 can include a flight management computer (FMC), an ACMS or other onboard maintenance computers, a Global Positioning System (GPS) receiver, aircraft engines, flight systems, flight sensors, or other onboard avionics systems. As there is a different set of avionics on each type of aircraft, avionics data sources 110 will vary depending on the aircraft type and configuration of the avionics on a particular aircraft.

The avionics data sources 110 send data to flight tracking application 120 through a data broadcast (e.g., 429 broadcast), a discrete input from aircraft sensors, or an integrated avionics backplane. The data sent by avionics data sources 110 can include latitude/longitude data, coordinated universal time (UTC) data, estimated time of arrival (ETA) data, air/ground state data, altitude, heading, airspeed, engine exception reports, intent data, or the like.

The flight tracking application 120 can be implemented in a communications management unit (CMU), a communications management function (CMF), an air traffic services unit (ATSU), an aircraft communications addressing and reporting system (ACARS) unit, an electronic flight bag, a cabin terminal, a flight crew device, an ACMS, or the like. The flight tracking application 120 includes an embedded operational software application that uses settings from the flight tracking database or software implementation 130, and aircraft data from avionics data sources 110.

The flight tracking database or software implementation 130 contains data that can be modified to match airline/operator preferences or aircraft type requirements. The database or software implementation 130 also provides the default preferences for an installation at start-up, with settings related to the flight tracking function including: normal rate of position reporting (the time rate interval between each position report during flight) to be used when no abnormal conditions have been recognized; abnormal rate of position reporting, to be used when an abnormal condition is detected (different abnormal rates for different conditions can be used, or all abnormal conditions can have the same abnormal rate); abnormal condition criteria, including indications of which set of conditions should be monitored to detect abnormal situations; and optionally, criteria used to determine a cruise period, during which flight tracking application will check for abnormal conditions (e.g., if aircraft falls below xx,xxx feet (altitude<xx,xxx feet) then abnormal condition is detected);

The flight tracking application 120 performs many functions, one of these being sending flight tracking position reports during flight. During normal operating conditions, the position reports are sent at normal reporting intervals (e.g., 15 minutes). During a cruise period for the aircraft, flight tracking application 120 periodically checks (e.g., once per second) various conditions, as specified using preferences from database or software implementation 130, or preferences sent from flight tracking ground center 140 or airline/operator ground computing center 160 using an uplinked message. In addition, in a configurable preference, the flight tracking ground center 140 may configure, via uplink, what data to include in the position reports.

In some embodiments, the preferences can define how long or how many times an abnormal condition must be detected before determining it is really an abnormal condition. For example, if the aircraft altitude drops too quickly in one detection sample but then stabilizes in subsequent detection samples, this is not considered to be an abnormal condition. But if the altitude does not stabilize after three detection samples, for example, this would be considered an abnormal condition. This may be another flight tracking configurable condition via uplink from flight tracking ground center 140 to flight tracking application 120 (e.g., configure how long or how many detection samples before declaring an abnormal condition has been detected.

If an abnormal condition is detected, flight tracking application 120 can optionally send a position report immediately, and also starts sending abnormal position reports at an increased reporting interval. The flight tracking application 120 includes in the position report aircraft data values (criteria used to detect abnormal conditions), latitude/longitude position, and indicates which abnormal conditions were detected. The flight tracking application 120 can also route engine exception/exceedance reports and other exception reports sent by the ACMS or other onboard maintenance computers to the ground using air/ground network 150. In some embodiments, the abnormal flight tracking feature is performed by an ACMS application. In this case, a CMU/CMF just routes the air/ground communications.

The flight tracking ground center 140 includes one or more computing systems with flight tracking capabilities. The flight tracking ground center 140 may at any time send an uplink message to the aircraft to change position reporting preferences used by flight tracking application 120. This may occur as a setup for a specific aircraft type, or due to changes during a flight such as flying into a more dangerous region where more frequent position reports are desired. The flight tracking ground center 140 can send the following uplinks to the aircraft: the normal reporting rate; the abnormal reporting rate (different rates for different conditions, same rate for all conditions); a message to turn off reporting for particular conditions; the criteria used to determine the cruise period during which the flight tracking application 120 will check for abnormal conditions; and the criteria that will be used to detect abnormal conditions.

The flight tracking ground center 140 monitors the position of the aircraft by monitoring position reports and other reports like ACMS exception or engine exceedance reports, or other AOC reports. If an ACMS exception report indicates a failure mode, the flight tracking ground center 140 may uplink a request to start abnormal position reporting to the aircraft. The flight tracking ground center 140 may also communicate with airline/operator ground computing center 160 to send alerts when abnormal position reports are received from the aircraft, including reasons for the abnormal position reports.

The airline/operator ground computing center 160 may communicate with flight tracking ground center 140 to send various requests to the aircraft, or may send the requests directly to the aircraft through air/ground network 150. The requests can be to receive position reports, or to make changes to position reporting preferences such as reporting rate intervals, criteria for cruise periods, and criteria for detecting abnormal conditions.

Figure 2:
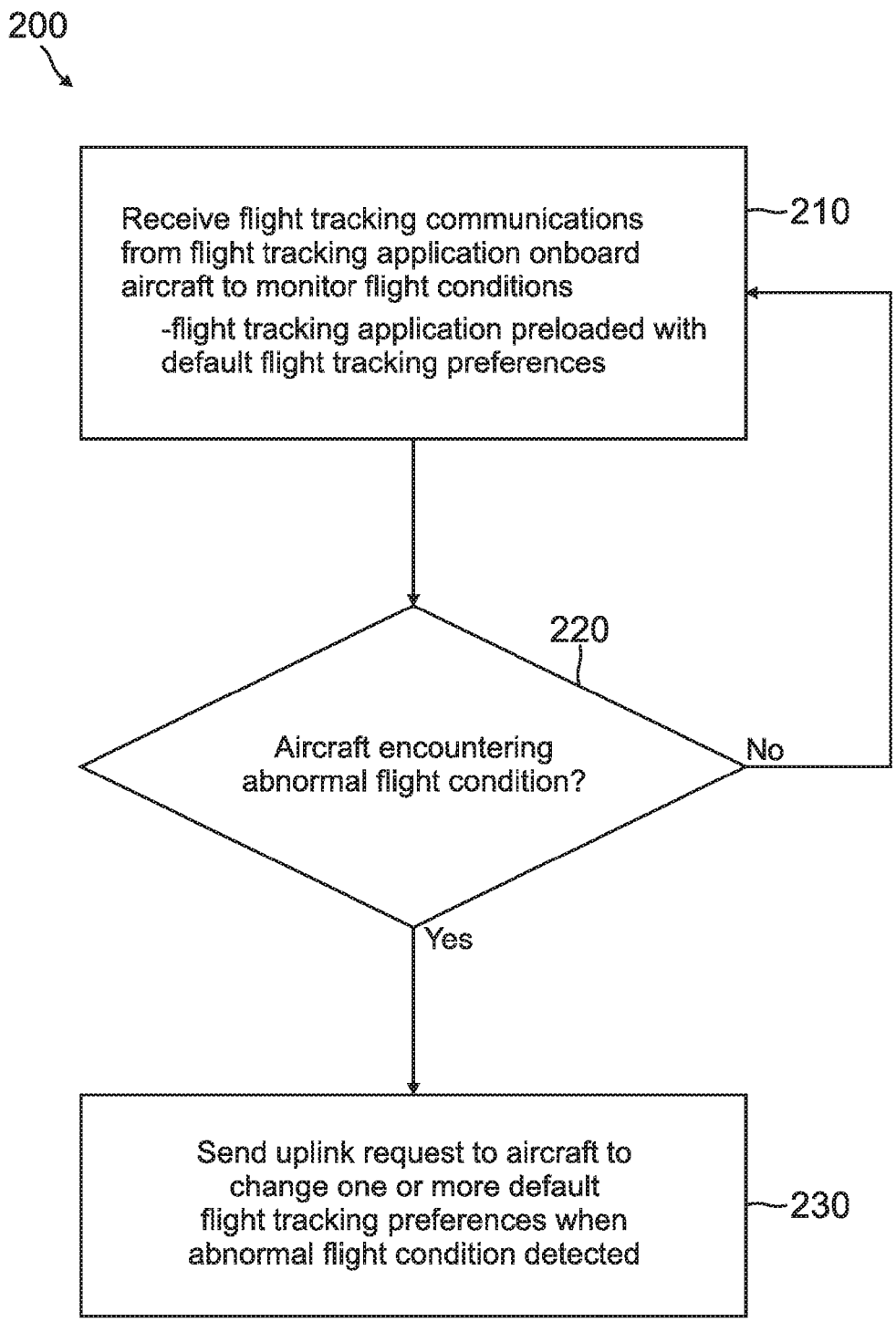
FIG. 2 is a flow diagram of a method for dynamic flight tracking of an aircraft, according to one implementation.

FIG. 2 is a flow diagram of a method 200 for dynamic flight tracking of an aircraft. The method 200 includes receiving, at a ground center, flight tracking communications from a flight tracking application onboard the aircraft to monitor flight conditions of the aircraft (block 210). The flight tracking application can be preloaded with various default flight tracking preferences as described previously. The method 200 then determines whether the aircraft is encountering any abnormal flight conditions (block 220). If not, method 200 continues to monitor the flight conditions of the aircraft based on the flight tracking communications from the aircraft. When an abnormal flight condition for the aircraft is detected, an uplink request is sent to the aircraft to change one or more of the default flight tracking preferences in the flight tracking application (block 230).

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system for dynamic flight tracking of an aircraft, the system comprising: a ground center configured to communicate with a flight tracking application onboard an aircraft, wherein the flight tracking application is preloaded with default flight tracking preferences comprising: a normal time rate interval for sending normal condition position reports to the ground center when a flight condition is normal; one or more abnormal time rate intervals for sending abnormal condition position reports to the ground center when one or more abnormal flight conditions are detected, the one or more abnormal time rate intervals less than the normal time rate interval; and abnormal flight condition criteria to determine which aircraft conditions to monitor for detecting abnormal flight conditions; wherein the ground center is operative to receive flight tracking communications from the aircraft for monitoring of flight conditions to determine if the aircraft is encountering any abnormal flight conditions; wherein the ground center is operative to send an uplink request to the aircraft to change one or more of the default flight tracking preferences.

Example 2 includes the system of Example 1, wherein the ground center comprises a flight tracking ground center that operatively communicates with the flight tracking application through an air/ground network.

Example 3 includes the system of Example 2, wherein the air/ground network is configured to support communications comprising very high frequency (VHF) communications, satellite communications (SATCOM), high frequency (HF) communications, datalink subnetwork communications, or combinations thereof.

Example 4 includes the system of Example 3, wherein the datalink subnetwork communications comprise WiFi communications, cellular communications, broadband SATCOM communications, AeroMACS, or combinations thereof.

Example 5 includes the system of any of Examples 2-4, wherein the flight tracking ground center operatively communicates with an airline/operator ground computing center.

Example 6 includes the system of Example 5, wherein the airline/operator ground computing center is configured to directly communicate with the flight tracking application through the air/ground network.

Example 7 includes the system of Example 6, wherein the flight tracking ground center is configured to send alerts to the airline/operator ground computing center when abnormal condition position reports are received from the flight tracking application.

Example 8 includes the system of Example 7, wherein the airline/operator ground computing center is configured to send requests to the flight tracking ground center to receive abnormal condition position reports and to change one or more of the default flight tracking preferences.

Example 9 includes the system of any of Examples 1-8, wherein the flight tracking preferences further comprise a cruise period criteria to determine a time period to monitor for abnormal flight conditions.

Example 10 includes the system of any of Examples 1-9, wherein the flight tracking application comprises an airline operational communication (AOC) application, or an aircraft condition monitoring system (ACMS) application.

Example 11 includes the system of any of Examples 1-10, wherein the flight tracking application is in operative communication with one or more avionics data sources.

Example 12 includes the system of Example 11, wherein the one or more avionics data sources comprise a flight management computer (FMC), an ACMS or other onboard maintenance computer, a global positioning system (GPS) receiver, one or more aircraft engines, one or more flight systems, or one or more flight sensors.

Example 13 includes the system of any of Examples 1-12, wherein the flight tracking application is in operative communication with a flight tracking database, or a flight tracking software module.

Example 14 includes the system of Example 13, wherein the flight tracking database comprises a configurable AOC database, and the flight tracking software module comprises a hardcoded AOC software module.

Example 15 includes the system of any of Examples 1-14, wherein the flight tracking application is implemented in a communications management unit (CMU), a communications management function (CMF), an air traffic services unit (ATSU), an aircraft communications addressing and reporting system (ACARS), an electronic flight bag, a cabin terminal, a flight crew device, or an ACMS.

Example 16 includes the system of Example 15, wherein the ACMS is in operative communication with an airline modifiable information (AMI) database.

Example 17 includes the system of any of Examples 1-16, wherein the flight tracking application is configurable to use a single abnormal time rate interval for all abnormal conditions.

Example 18 includes the system of any of Examples 1-16, wherein the flight tracking application is configurable to use different abnormal time rate intervals for different abnormal conditions.

Example 19 includes a method for dynamic flight tracking of an aircraft, the method comprising: receiving at a ground center, flight tracking communications from a flight tracking application onboard the aircraft to monitor flight conditions of the aircraft, wherein the flight tracking application is preloaded with default flight tracking preferences comprising: a normal time rate interval for sending normal condition position reports to the ground center when a flight condition is normal; one or more abnormal time rate intervals for sending abnormal condition position reports to the ground center when one or more abnormal flight conditions are detected, the one or more abnormal time rate intervals less than the normal time rate interval; and abnormal flight condition criteria to determine which aircraft conditions to monitor for detecting abnormal flight conditions; determining whether the aircraft encounters any abnormal flight conditions; and sending an uplink request to the aircraft to change one or more of the default flight tracking preferences in the flight tracking application when one or more abnormal flight conditions are detected.

Example 20 includes the method of Example 19, wherein the flight tracking preferences further comprise a cruise period criteria to determine a time period to monitor for abnormal flight conditions.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for dynamic flight tracking of an aircraft, the system comprising:
   a ground center configured to communicate with a flight tracking application onboard an aircraft, wherein the flight tracking application is preloaded with default flight tracking preferences comprising:
      a normal time rate interval for sending normal condition position reports to the ground center when a flight condition is normal;
      one or more abnormal time rate intervals for sending abnormal condition position reports to the ground center when one or more abnormal flight conditions are detected, the one or more abnormal time rate intervals less than the normal time rate interval; and
      abnormal flight condition criteria to determine which aircraft conditions to monitor for detecting abnormal flight conditions;
   wherein the ground center is operative to receive flight tracking communications from the aircraft for monitoring of flight conditions to determine if the aircraft is encountering any abnormal flight conditions;
   wherein the ground center is operative to send an uplink request to the aircraft to change one or more of the default flight tracking preferences;
   wherein the flight tracking application comprises an airline operational communication (AOC) application, or an aircraft condition monitoring system (ACMS) application;
   wherein the flight tracking application is implemented in a communications management unit (CMU), a communications management function (CMF), an air traffic services unit (ATSU), an aircraft communications addressing and reporting system (ACARS), or an ACMS.

2. The system of claim 1, wherein the ground center comprises a flight tracking ground center that operatively communicates with the flight tracking application through an air/ground network.

3. The system of claim 2, wherein the air/ground network is configured to support communications comprising very high frequency (VHF) communications, satellite communications (SATCOM), high frequency (HF) communications, datalink subnetwork communications, or combinations thereof.

4. The system of claim 3, wherein the datalink subnetwork communications comprise WiFi communications, cellular communications, broadband SATCOM communications, AeroMACS, or combinations thereof.

5. The system of claim 2, wherein the flight tracking ground center operatively communicates with an airline/operator ground computing center.

6. The system of claim 5, wherein the airline/operator ground computing center is configured to directly communicate with the flight tracking application through the air/ground network.

7. The system of claim 6, wherein the flight tracking ground center is configured to send alerts to the airline/operator ground computing center when abnormal condition position reports are received from the flight tracking application.

8. The system of claim 7, wherein the airline/operator ground computing center is configured to send requests to the flight tracking ground center to receive abnormal condition position reports and to change one or more of the default flight tracking preferences.

9. The system of claim 1, wherein the flight tracking preferences further comprise cruise period criteria to determine a time period to monitor for abnormal flight conditions.

10. The system of claim 1, wherein the flight tracking application is in operative communication with one or more avionics data sources.

11. The system of claim 10, wherein the one or more avionics data sources comprise a flight management computer (FMC), an ACMS or other onboard maintenance computer, a global positioning system (GPS) receiver, one or more aircraft engines, one or more flight systems, or one or more flight sensors.

12. The system of claim 1, wherein the flight tracking application is in operative communication with a flight tracking database or software module, which contain data that can be modified to match airline/operator preferences or aircraft type requirements, and provide default preferences for an installation at start-up, with settings related to the flight tracking function.

13. The system of claim 12, wherein the flight tracking database comprises a configurable AOC database, and the software module comprises a hardcoded AOC software module.

14. The system of claim 1, wherein the ACMS is in operative communication with an airline modifiable information (AMI) database.

15. The system of claim 1, wherein the flight tracking application is configurable to use a single abnormal time rate interval for all abnormal conditions.

16. The system of claim 1, wherein the flight tracking application is configurable to use different abnormal time rate intervals for different abnormal conditions.

17. A method for dynamic flight tracking of an aircraft, the method comprising:
receiving at a ground center, flight tracking communications from a flight tracking application onboard the aircraft to monitor flight conditions of the aircraft, wherein the flight tracking application is preloaded with default flight tracking preferences comprising:
a normal time rate interval for sending normal condition position reports to the ground center when a flight condition is normal;
one or more abnormal time rate intervals for sending abnormal condition position reports to the ground center when one or more abnormal flight conditions are detected, the one or more abnormal time rate intervals less than the normal time rate interval;
abnormal flight condition criteria to determine which aircraft conditions to monitor for detecting abnormal flight conditions; and
cruise period criteria to determine a time period to monitor for abnormal flight conditions;
determining whether the aircraft encounters any abnormal flight conditions; and
sending an uplink request to the aircraft to change one or more of the default flight tracking preferences in the flight tracking application when one or more abnormal flight conditions are detected.

* * * * *